United States Patent [19]
Terry et al.

[11] Patent Number: 5,981,010
[45] Date of Patent: Nov. 9, 1999

[54] POLYURETHANE-MODIFIED BITUMEN COATING COMPOSITION

[75] Inventors: C. Edward Terry; Raymond A. Berard, both of Kennesaw; Daniel F. Pinholster, Jr., Cartersville, all of Ga.

[73] Assignee: Interface, Inc., LaGrange, Ga.

[21] Appl. No.: 09/093,927

[22] Filed: Jun. 9, 1998

Related U.S. Application Data

[62] Division of application No. 08/500,253, Jul. 10, 1995, Pat. No. 5,763,036.

[51] Int. Cl.$^6$ .............................. C08L 53/02; C08G 18/12
[52] U.S. Cl. ...................... 428/40.1; 428/40.3; 428/41.7; 428/41.8; 428/429; 428/490; 428/491; 428/332; 428/337; 428/339; 524/59
[58] Field of Search .................................. 428/40.3, 40.1, 428/41.7, 41.8, 489, 490, 491, 332, 337, 339; 524/59

[56] References Cited

U.S. PATENT DOCUMENTS

| | | | |
|---|---|---|---|
| 3,895,149 | 7/1975 | Sheffler et al. | 428/94 |
| 4,201,812 | 5/1980 | Blanken et al. | 428/489 |
| 4,871,792 | 10/1989 | Lucke | 524/59 |
| 5,008,311 | 4/1991 | Janoski | 524/59 |
| 5,096,764 | 3/1992 | Terry et al. | 428/95 |

FOREIGN PATENT DOCUMENTS 113635  5/1989  Japan.
62-296403  5/1989  Japan.

OTHER PUBLICATIONS

"Poly BD—Polyurethanes Based on Poly BD Resins in Building and Civil Engineering Construction" Colloque Europeen Lyon 1992, Sep. 8–9, 10, Evelyne Bonnet, Jean Jacques Flat, Philippe Hubin–Eschger.

"Poly BD Resins in Urethane Elastomers", ATOCHEM product bulletin.

Abstract for Japanese Patent Application Pub # JP 61174282, Pub Aug. 5, 1986—Kurashige Yuzo et al, Inventors "Adhesive for Anti–corrosive Tape".

Abstract for Japanese Patent Application Pub # JP 59036158 Pub. Feb. 28, 1984—Kurashige Yuzo et al Inv. "Bituminous Composition".

Abstract for Japanese Patent Application Pub # JP 61101567 Pub May 20, 1986 Kurashige Yuzo et al Inventors "Paint Preventing Deposition of Marine Life".

Abstract for JapanesePaten Application Pub # JP 61255973 Pub. Nov. 13, 1986—Kurashige Yuzo et al Inventors "Composition for Bonding Resin".

*Primary Examiner*—Charles Nold
*Attorney, Agent, or Firm*—Richard P. Crowley

[57] ABSTRACT

A polyurethane-modified bitumen coating composition of selected surface tack and fluidity. The composition includes: bitumen; a minor modifying amount of a polyurethane prepared by the reaction of a polyisocyanate and a hydroxyl terminated polybutadiene; a tackifier; and a filler material.

17 Claims, 2 Drawing Sheets

POLYURETHANE-MODIFIED BITUMEN COATING COMPOSITION

REFERENCE TO PRIOR APPLICATION

This application is a divisional application of U.S. patent application Ser. No. 08/500,253, filed Jul. 10, 1995, now U.S. Pat. No. 5,763,036, issued Jun. 9, 1998.

BACKGROUND OF THE INVENTION

Asphalt is a solid or viscous, typically semisolid, mixture of hydrocarbons which are amorphous, and the predominant constituents of asphalt are bitumens derived from refinery petroleum. Asphalts and/or bitumens are typically employed for paving, road coatings, roofings, sealing and also for carpet backing, such as a bitumen-backed carpet tile.

Asphalt or bitumen has been employed as a backing layer for carpet material. Such bitumen employed as a backing layer has been modified by the addition of various polymers, for example, styrene-butadiene-styrene block copolymers as described in U.S. Pat. No. 4,201,812 as well as mixtures of high and low density polyethylene polymers, and by urethane polymers as described more particularly in U.S. Pat. No. 5,096,764, issued Mar. 17, 1992, hereby incorporated by reference. Bitumen used as a backing layer for a carpet material has been modified by employing therein a urethane reaction product composed of a hydroxyl-terminated, long-chain diene hydrocarbon and a polyisocyanate to provide a carpet material which is heat stable during a wet steam process printing operation. The liquid hydroxyl-terminated homopolymers of butadiene employed as the modifying polymers in the bitumen carpet backing layer are commercially sold as Poly-BD® liquid resins (a trademark of ELF-Atochem SA of Hauts-de-Seine, France), and their use with various polymers and components are described in an advertising brochure "Poly bd® resins In Urethane Elastomers", also hereby incorporated by reference.

Asphalt or bitumen has a primary use as a moisture barrier for masonry, such as poured concrete, in the construction of commercial and residential buildings wherein a bitumen coating is typically applied to the exterior wall after the concrete foundation has been poured to prevent the penetration of moisture. The use of bitumen coatings as a moisture-protective barrier by itself is difficult, since bitumen tends to be too fluid, therefore usually requiring a backing and also a filler, such as a modified polymer, like the styrene-butadiene-styrene, in order to stiffen the bitumen as a moisture barrier. However, bitumen even with a filler and a styrene-butadiene-styrene copolymer is not satisfactory at normal operating ranges, since at the high temperature end of the application of the bitumen as a moisture barrier, say for example 80° F. to 110° F., the bitumen is too fluid, while at low temperatures, the bitumen exhibits diminished surface tackiness, for example, in the 10° F. to 30° F. range, so that the bitumen does not stick to the masonry it is designed to protect.

Therefore, it is desirable to provide for a new, improved, modified bitumen composition sheet material and method as a moisture barrier in which the modified bitumen sheet material may be employed over a range of temperatures with satisfactory characteristics, such as preventing the passage of moisture, tackiness and flexibility.

SUMMARY OF THE INVENTION

The invention concerns a modified bitumen sheet material and method as a moisture barrier. In particular, the invention is directed to a polybutadiene urethane-polymer-modified, bitumen-containing sheet material and method as a moisture barrier for concrete structures.

The invention is directed to a modified bitumen sheet material, adapted particularly for use as a moisture barrier for masonry, such as poured concrete, and which sheet material comprises a modified bitumen layer, which bitumen layer comprises bitumen (or asphalt used interchangeably with bitumen), optionally a filler material, such as an inert, low cost, particulate filler, optionally a tackifier agent and a minor modifying amount of a urethane polymer, the urethane polymer prepared by the reaction of a polyisocyanate, such as an aromatic diisocyanate, with a long-chain polydiene hydrocarbon, such as a polybutadiene, having isocyanate-reactive terminal groups, particularly hydroxyl terminal groups, which react with the polyisocyanate. The urethane-modified bitumen layer is selected in composition to impart stable, non-flow properties to the bitumen layer and also a selected degree of surface tackiness to the bitumen layer over a selected general use temperature range in which the bitumen layer is employed as a moisture barrier.

The sheet material includes a thin, polymer film, particularly, for example, a thin film of non-heat-shrinkable film, such as an oriented olefinic resin, like a polyethylene or a polyester, for example, from about 0.5 to 5 mils in thickness on one surface of the bitumen layer, and also includes a thin, releasable film on the other surface of the bitumen layer, such as a paper casting sheet having a surface treatment, like a silicone coating, which provides for the releasable film sheet to be easily removed prior to use of the sheet material to expose the tackified surface of the bitumen layer for application to a wall surface of the masonry to be protected.

Optionally, but preferably, the bitumen composition should contain a modifying amount of a tackifier agent which is compatible with the urethane-modified bitumen composition and which permits the adjustment of the degree of tackiness to the urethane-bitumen composition. Suitable tackifier agents would include waxes, resins and oils. In particular, petroleum or petroleum-derived mineral oil, such as aliphatic, aromatic or mixed base hydrocarbon oil has been discovered to be a satisfactory tackifier agent with the urethane-bitumen composition, generally in the range of 0% to 30%, e.g. 10% to 25%, by weight of the urethane-bitumen composition. Generally, the tackifier agent is added to the bitumen and filler where a multiple vessel preparation system is used.

The composition of the bitumen layer may vary as desired as to the type and nature of the bitumen, of the fillers, and of the modifying urethane polymer employed in order to provide the desirable balance of properties of both being flexible and stable and having a tacky surface depending upon the particular usage and climate on application to which the bitumen sheet material is employed. Thus, the modified bitumen sheet material may be formulated for example for use at various particular temperature ranges or may be formulated for use as a general residential and commercial building moisture barrier sheet material. The sheet material is provided in roll form for application of the exposed tacky surface of the bitumen layer to the exposed exterior, or even interior, surface of a surface, such as a poured concrete wall, to provide for an effective barrier layer. It is desirable to provide for a modified bitumen sheet material which exhibits desirable properties, that is, surface tackiness on the exposed bitumen layer surface after removal of the releasable film, as well as flexibility and stability over a range of about 10° F. to 125° F., and more typically, 25° F. to 100° F., which would cover most moderate climatic operations. The desired flexibility should be such as to permit the sheet material to be manufactured, employed and transported to the site typically in roll form, so that it may be easily unrolled, cut to desired lengths for application and then applied to a surface, typically a vertical concrete wall surface, for example, about the exterior surface of a poured foundation. The bitumen exposed surface layer should be sufficiently tacky when the releasable film is removed to permit the exposed bitumen layer surface to adhere to the masonry wall surface, at least for a sufficient time to permit the back filling of earth against the foundation wall or for the application of other wall surfaces or other coating or treatment applications, where desired, to the moisture barrier sheet.

The bitumen or asphalt employed as the primary constituent may represent straight run, cut back asphalt low asphaltene bitumen, or blown asphalt and may vary in penetration properties, but typically ranging from about 10 to 100, more typically 30 to 80, in penetration value. The filler material employed may vary and generally is an inert-type filler material, either fibrous or particulate, and more particularly, comprises calcium carbonate, talc, clay, diatomaceous earth or other low cost-type filler material which is easily dispersed into the bitumen in order to stiffen the bitumen and to lower the cost of the resulting bitumen layer. However, calcium carbonate is the preferred particulate material to be employed in fine particle size of less than about an average size of 100 $\mu$m, and typically less than 20$\mu$m, in a range of at least 6% by weight of the bitumen layer, and generally ranging from about 0 to 40 weight percent, but more typically from 5 to 25 weight percent of the bitumen composition.

The urethane polymer is a reaction product generally reacted in situ in the melted bitumen by the addition of polyisocyanate and the addition of the long-chain diene polymer, typically in the presence of a urethane catalyst curing system. The bitumen and the components are mixed to provide for an in situ reaction urethane polymer, wherein the components of the urethane polymer are dispersed within the hot bitumen forming an interpenetrating polymer network (IPN) prior to the formation, i.e. casting or pouring, of the hot-melt bitumen composition onto a releasable film, usually supported on a movable belt, to form the sheet material. The long-chain diene hydrocarbon polymer employed has terminal groups, more particularly, hydroxyl terminal groups, or amine-type terminal groups or any other isocyanate reaction-type groups which would permit the long-chain diene, i.e. $C_4$–$C_6$, hydrocarbon polymer to provide for a desirable reaction with the isocyanate groups. One particular long-chain diene polymer employed comprises a homopolymer of polybutadiene, commercially known as Poly-BD® resin, having a hydroxyl functionality ranging from about 2.2 to about 2.6, which is particularly reactive with aromatic diisocyanates, and which polymer has primarily terminal hydroxyl groups of the allylic type. While the bitumen composed of a reasonably high molecular weight carbon chain typically has limited compatibility with the isocyanate, polybutadiene or low weight polybutadiene-urethane polymer, the components are easily admixed. The use of a long-chain diene hydrocarbon with terminal isocyanate reactive groups exhibits the most compatibility with the non-polar bitumen. The polyurethane polymer provides for the formation of a cross-linked, interpenetrating urethane polymer network through the normally thermoplastic bitumen to provide a urethane-modified bitumen which will no longer flow, i.e. is stable but will retain tacky properties. The isocyanate is chemically bonded to the bitumen by the isocyanate-reactive groups, like amine groups, on the bitumen.

While in one preferred embodiment, the isocyanate and the long-chain hydrocarbon are reacted in situ with the hot bitumen and then filler material added and dispersed therein, it is also recognized that the urethane polymer can be separately reacted, for example, as a prepolymer, and then dispersed by mixing or a dispersion mill into the bitumen. The reaction may be carried out employing varying amounts of the isocyanate and the long-chain polydiene hydrocarbon, but typically the reaction is carried out using a stoichiometric amount or with a slight excess of the polyisocyanate, i.e. in an equivalency ratio of about 1.0 to 1.1. It is recognized that the reactive long-chain poly $C_4$–$C_6$ hydrocarbon, i.e. polybutadiene, may be used in less than stoichiometric amounts and also used in combination and with mixtures of other polyols, amines or amine polyol compounds reactive with isocyanates or isocyanate prepolymers containing polyols prepared with these compounds for admixture with the bitumen, such compounds and prepolymers known and used in the urethane field to produce urethane polymers. The urethane polymers so produced provide desired modified polyol or amine polyol-hydroxy polybutadiene-isocyanate reaction products as a modifying agent for the bitumen. Suitable polyols would include, but not be limited to: $C_2$–$C_{10}$ polyols, like butane diols, hexane diols, trimethylolpropane, propylene glycol, or polyethylene polyols prepared using $C_2$–$C_4$ oxide, like ethylene and propylene oxides and halogenated oxides.

As set forth, the nature and amount of the various ingredients in the bitumen layer may be varied as desired for desired properties within the sheet material, for example and not in limitation thereof, a bitumen composition may comprise about 100 parts bitumen (straight run or oxidized) with 10 to 70 parts of a particulate filler, like calcium carbonate, and the urethane polymer in an amount of about 2% to 25% by weight of the composition, more typically ranging from about 6% to 18% with the polymer prepared with a hydroxy-terminated polybutadiene and reacted with a minor amount of an MDI in the presence of a catalyst system. The reaction usually is carried out in the presence of a urethane curing system which may include, for example, an organo-metal compound alone or in combination with other catalysts with various amines as accelerators, such as for example, but not limited to a dialkyl metal, e.g. tin, di-fatty acid, and more particularly, a di-butyl tin dilaurate catalyst. The components are brought together in a heater-mixer with the bitumen and heated to about 180° F. or higher, such 200° F. to 300° F., to provide the urethane polymer bitumen composition.

The releasable sheet material comprises strippable or releasable casting paper or other type film which does not adhere to the surface of the bitumen layer, typically, a thin casting paper having a silicone coating thereon of about 1 to 5 mils in thickness and typically, 2 to 4 mils, and upon which the hot melt, modified, urethane polymer bitumen composition is cast and formed into a bitumen layer by a casting knife or roller operation, and then permitted to cool on the releasable paper. The releasable paper is easily stripped off in use, usually just prior to use as a moisture barrier layer, to expose the tacky surface of the bitumen layer for pressing against a concrete wall or other surface.

The thin, outer film or other film employed may vary in composition and thickness and a wide variety of polymer layers used, either in single or double layers or as polymer-metal foil layers. The outer film may be used as a moisture barrier film; however, this outer film need not be a moisture barrier-type film, but is employed primarily to allow handling of the moisture-barrier, tacky bitumen layer. However, in particular, it is desirable to use an olefinic-type resin, typically ranging from 1 to 10 mils in thickness, for example, 1 to 5 mils, and generally of a polyethylene, thin film material, which is sufficiently stable at the melting point or the bitumen application temperature of the urethane-modified bitumen layer, so that it will not shrink or change characteristics. Thus, for example, particularly preferred are cross-linked-type olefinic resins and more particularly, a cross-linked, low density polyethylene film which will not shrink at the casting temperatures of a hot bitumen layer formation and which adheres to the bitumen layer.

The sheet material may be prepared by charging a heated mixing vessel with the bitumen, filler, curing system, long-chain polymer, polyisocyanate and other additives as desired, which may include stabilizers, surfactants, dispersants, pigments, dyes, tackifiers, other polymers and resins, waxes and the like, and the admixture heated and mixed to provide for the in situ reaction of the polyisocyanate and the hydrocarbon to provide for a urethane-modified bitumen. All the components need not be charged into a single heater-mixer; rather, in a preferred embodiment, one vessel will contain the hydroxy-terminated polybutadiene and the selected curing agents and other additives, the bitumen and filler heated and premixed in a second vessel and the polyisocyanate in a third vessel. The mixed components of the first and second vessel and the isocyanate in the third vessel may then be mixed in an injection nozzle at the point of dispensing and pouring the mixed components onto the releasable film supported on a conveyor belt. adhere a single heater-mixer vessel is used, the filler would be dispersed into the hot, melted bitumen prior to the addition of the curing system, the reactive, long-chain polydiene hydrocarbon and the polyisocyanate, then all components mixed and then dispersed to form a urethane-modified bitumen layer.

The hot bitumen composition is injected or cast onto a releasable film to form a bitumen layer, such as with the employment of a casting knife, to form a layer of moisture-barrier bitumen on the releasable film which may vary in thickness, but for example may range from about 30 to 150 mils, and more typically 40 to 100 mils in thickness. After the applying of the bitumen layer, the thin moisture barrier layer is gently pressed or laid on the top surface of the hot melt bitumen layer, the bitumen then permitted to cool or is cooled by the use of water-cooled plates usually beneath the belt, and then the resulting flexible sheet material rolled up in roll form for subsequent packaging and use in the field.

In use, the rolled up bitumen sheet material is transported to a construction or use site, and the sheet material cut to the desired lengths. The releasable casting film material is removed to expose the tackified surface, and the tacky surface then placed, i.e. pressed, against the masonry or other surface it is designed to protect, and held in place by the tacky nature of the exposed surface of the bitumen layer. The sheet material may be employed as adjacent sheet materials or the adjacent sheet materials may be overlapped as desired, and may further be spray coated by other polymers or used with other sheet material laid thereover or back filled of earth in whole or part as desired. The sheet material provides an effective, flexible, tackified, stabilized moisture barrier and method which may be employed not only on masonry surfaces, but also in a wide variety of applications wherein desirable protective barrier properties are required across a desired temperature range.

The invention will be described for the purposes of illustration only in connection with certain, specific illustrated embodiments; however, it is recognized that those persons skilled in the art may make various modifications, changes, additions and improvements to the illustrated embodiments, without departing from the spirit and scope of the invention.

DESCRIPTION OF THE EMBODIMENTS

Figure 1:
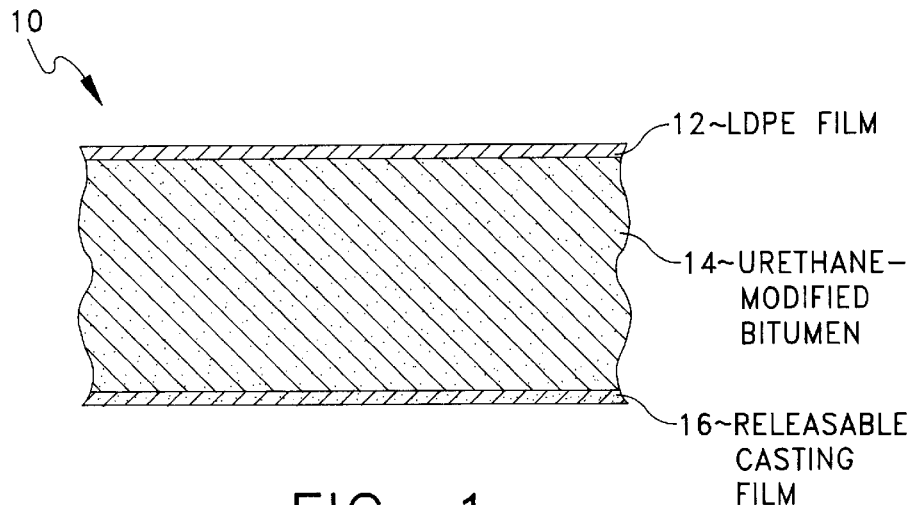
FIG. 1 represents an enlarged, cross-sectional view of the sheet material of the invention.

FIG. 1 shows a moisture barrier sheet material 10 having a urethane-modified bitumen layer 14 of 40 to 80 mils, a releasable, non-stick casting paper 16 of 1 to 2 mils and an outer handling film composed of low density, cross-linked, heat: stable to 160° F. polyethylene film 12.

Figure 2:
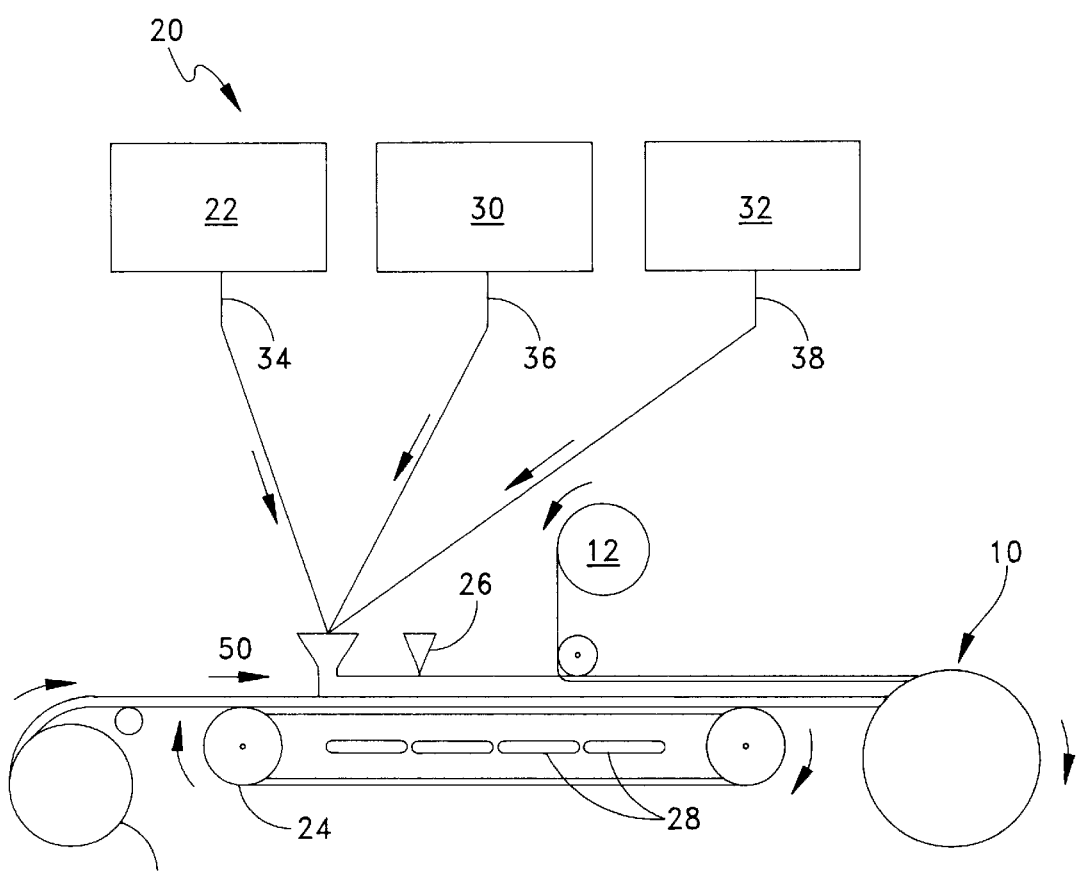
FIG. 2 is a schematic, illustrative process for producing the sheet material of FIG. 1.

FIG. 2 shows a process 20 for manufacturing the sheet material 10 employing heated mixing vessels 22, 30 and 32 wherein the bitumen and filler calcium carbonate are heated in vessel 30 to about 180° F. to 270° F. The other vessels 32 and 22 contain the other components, and all components are fed through lines 34, 36 and 38 to a mixing-injection nozzle 50 to admix and inject the polymer-bitumen composition onto the top surface of release paper 16. The urethane polymer is formed in situ in the nozzle 50. The hot, melted, injected bitumen composition is cast as layer of 40 to 80 mils in thickness by a knife 26 on the release surface of casting paper 16 supported on an endless stainless steel or non-stick fluorocarbon or other type conveyor belt 24. A low density polyethylene barrier film 12 is then fed from a roll and pressed onto the hot, exposed surface of the bitumen cast layer to adhere to the cooled bitumen layer. The bitumen layer is cooled by water cooling plates 28 beneath the conveyor belt 24, and the resulting product placed in roll form.

Figure 3:
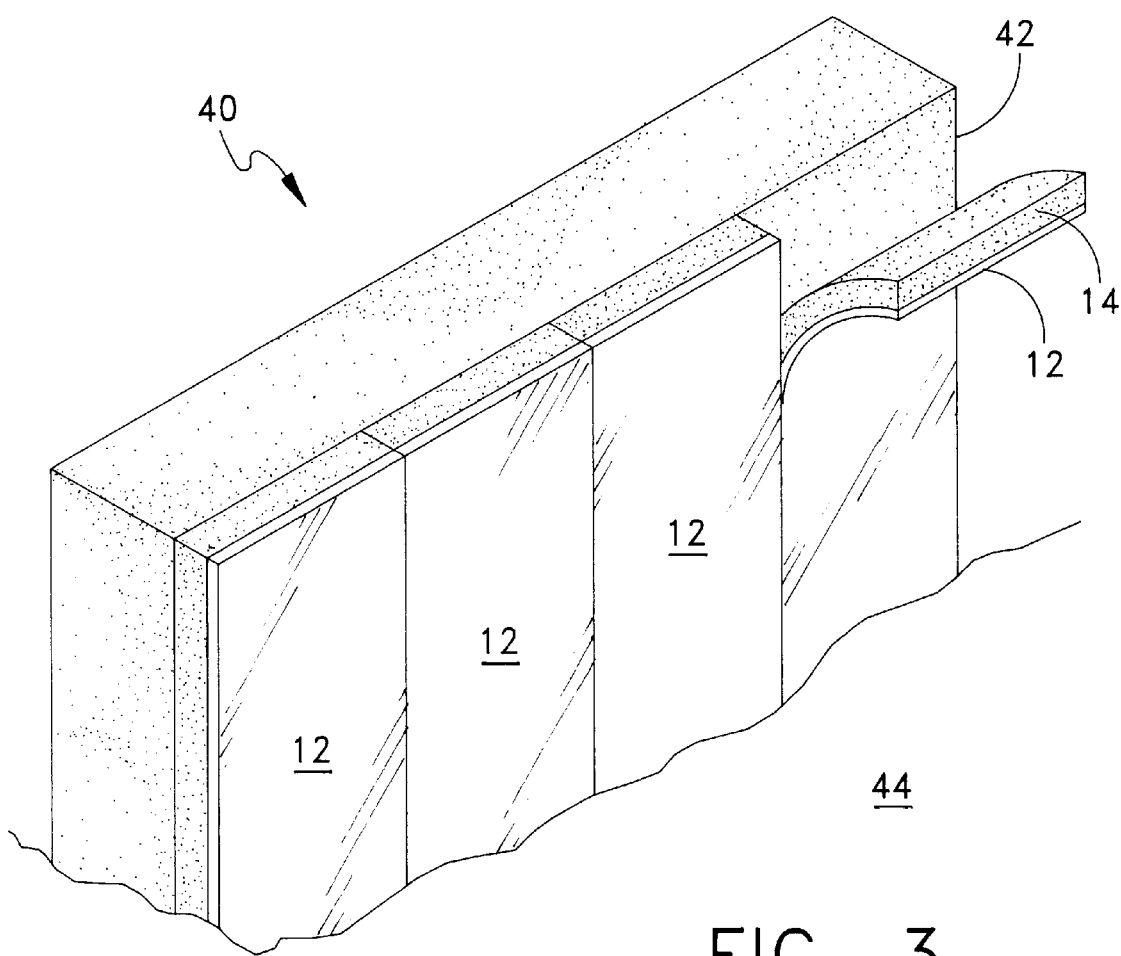
FIG. 3 is an illustrative, schematic drawing of the application of the sheet material of FIG. 1 to a masonry surface.

FIG. 3 shows a concrete wall protection system 40 with a poured, vertical, concrete foundation wall 42 with cast pieces of the sheet material 10 with casting paper 16 removed and the exposed tacky surface adhering to the concrete surface with earth 44 placed against a portion of the previous attached, secured sheet material 12 and 14.

EXAMPLE I

The following bitumen-asphalt composition formula was prepared. The first five components are added to and mixed with asphalt at 250° F., the temperature adjusted to 230° F. before adding the catalyst.

| | | |
|---|---|---|
| Asphalt-bitumen | 350 | grams (straight run hydrocarbon) |
| Oil | 54 | |
| CaCO$_3$ | 70 | |
| Poly BD ® | 65.5 | (hydroxy-terminated polybutadiene) |
| (MDI) Isocyanate | 8.2 | |
| Catalyst | 0.1 | (dibutyl tin di-laurate) |
| Total | 547.8 | grams |

The hot composition is poured directly onto release film supported on a belt and cures adequately after leveling to roll on line.

EXAMPLE II

The example shows the effect of cure time on the amount of catalyst present in the mixture.

|  | A | B | C | D |
|---|---|---|---|---|
| Asphalt | 21.0 gr | 21.0 | 21.0 | 21.0 |
| Oil | 3.2 | 3.2 | 3.2 | 3.2 |
| CaCO$_3$ | 4.2 | 4.2 | 4.2 | 4.2 |
| Poly BD ® | 3.9 | 3.9 | 3.9 | 3.9 |
| Isocyanate | 0.49 | 0.49 | 0.49 | 0.49 |
| Catalyst | 0.003 | 0.006 | 0.012 | 0.024 |
| Cure Time | 30 min | 10 min | 5 min | 1 min |

The optimum cure time is about ½ to 10 minutes, depending upon the time required to cast the composition, form a coating layer on the release film and apply a top cover of the barrier film. The cure time may vary depending upon the amount of catalyst, as illustrated, and also may vary depending upon the type of catalyst or combination of catalysts used.

EXAMPLE III

This example shows the effect on cold tack and fluidity at 100° F. by varying the amount of oil. Tack is determined empirically by finger test against the composition surface, while fluidity is determined empirically by applying the composition to a vertical wall surface and observing downward movement with time; however, other tests of tack and fluidity may be used.

|  | A | B | C | D | E |
|---|---|---|---|---|---|
| Asphalt | 73.8 gr | 73.8 | 73.8 | 73.8 | 73.8 |
| Oil | 11.4 | 15.0 | 20.0 | 25.0 | 30.0 |
| CaCO$_3$ | 14.8 | 14.8 | 14.8 | 14.8 | 14.8 |
| Poly BD ® | 15.0 | 15.0 | 15.0 | 15.0 | 15.0 |
| Isocyanate | 1.88 | 1.88 | 1.88 | 1.88 | 1.88 |
| Catalyst | 0.1 | 0.1 | 0.1 | 0.1 | 0.1 |
| Tack (25° F.) | Fair | Fair | Good | Good | Good |
| Fluidity (100° F.) | Good | Good | Good | Fair | Poor |

These results show that there is an optimum range of oil content with this composition to have a product with good tack at 25° F. and good structural integrity, or non-fluidity, at 100° F. The optimum oil amount range for this composition is from about 5 to 25 grams by weight, or preferably 15 to 25 grams or 12.8% to 21.1% by weight.

EXAMPLE IV

The following example shows the results of varying the mole ratio of polyol to isocyanate.

|  | A | B | C | D |
|---|---|---|---|---|
| Asphalt | 73.8 gr | 73.8 | 73.8 | 73.8 |
| Oil | 11.4 | 11.4 | 11.4 | 11.4 |
| CaCO$_3$ | 14.8 | 14.8 | 14.8 | 14.8 |
| Poly BD ® | 15.0 | 15.0 | 15.0 | 15.0 |
| Isocyanate | 1.88 | 1.6 | 1.3 | 1.1 |
| Catalyst | 0.1 | 0.1 | 0.1 | 0.1 |
| Equiv Ratio (ISO/Poly-BD) | 1.0 | 0.85 | 0.72 | 0.6 |

As the level of isocyanate is decreased, the tack increases at 25° F., but 100° F. fluidity suffers when the equivalent ratio drops below 0.85. The optimum range of Poly-BD® in this composition is about 25 to 10 or preferably 20 to 10 with isocyanate about 3.0 to 1.0 or preferably 2.5 to 1.25.

EXAMPLE V

This series shows the effect of varying the amount of urethane in the composition.

|  | A | B | C | D |
|---|---|---|---|---|
| Asphalt | 73.8 gr | 73.8 | 73.8 | 73.8 |
| Oil | 11.4 | 11.4 | 11.4 | 11.4 |
| CaCO$_3$ | 14.8 | 14.8 | 14.8 | 14.8 |
| Poly BD ® | 30.0 | 15.0 | 6.0 | 3.0 |
| Isocyanate | 3.76 | 1.88 | 0.75 | 0.37 |
| Catalyst | 0.1 | 0.1 | 0.1 | 0.1 |

Sample A built too much strength and reduced the tack. Samples C and D did not build enough strength to make a viable product. Sample B produced a tacky product with good cold tack and good 100° F. fluidity. This composition employed a constant amount of oil. The composition can be used without any oil, but oil additive is preferred as a tackifier to provide the proper balance between structural integrity (stiffness) given by the urethane polymer with some tackiness, and an increased level of tackiness with structural integrity over the desired temperature range. Therefore, the amount of Poly-BD® can vary from about 3 to 30 grams in this composition if the amount of oil is also adjusted; however, high amounts of urethane polymer are limited by cost factors.

What is claimed is:

1. A polymer-modified bitumen coating composition adapted for use as a moisture-barrier coating layer, which composition comprises:
   a) bitumen;
   b) a modifying minor amount of a urethane polymer prepared in situ with melted bitumen by the reaction of a polyisocyanate with a long-chain, polydiene hydrocarbon with reactive terminal groups, which groups react with the polyisocyanate to form said a urethane polymer, the urethane polymer mixed and dispersed in the bitumen to form a cross-linked, interpenetrating polymer network, with the urethane polymer chemically bonded to the bitumen by terminal groups;
   c) a tackifier agent in sufficient minor amount to impart surface tackiness to the surface of the bitumen composition;
   d) a minor amount, about 5 to 25 percent by weight, of a particulate filler material; and
   e) the bitumen composition characterized by a selected degree surface tackiness and stable fluid properties over a temperature range of about 10 to 125 degrees Fahrenheit.

2. The composition of claim 1 wherein the polydiene hydrocarbon comprises a hydroxyl-terminated polybutadiene.

3. The composition of claim 1 wherein the filler material comprises calcium carbonate having an average particle size of less than about 100 microns.

4. The composition of claim 1 wherein the urethane polymer comprises from about 2 to 30 percent by weight of the composition.

5. The composition of claim 1 wherein the tackifier agent comprises a mineral oil.

6. The composition of claim 5 wherein the tackifier agent comprises from about 5 to 25 percent by weight of the composition.

7. The composition of claim 1 wherein the composition is characterized by a stable, non-fluid property in a vertical position over a temperature range of about 20 to 100 degrees Fahrenheit.

8. A coating layer of the composition of claim 1 which has a thickness of about 20 to 150 mils.

9. The composition of claim 1 wherein the bitumen comprises a propane-deactivated bitumen.

10. The composition of claim 1 wherein the reaction occurs in situ with melted bitumen at a coating applicator.

11. The composition of claim 1 wherein the composition comprises a sheet material in roll form and adapted to be unrolled in use.

12. The composition of claim 1 wherein the bitumen has a penetration value of about 10 to 100.

13. The composition of claim 1 wherein the urethane polymer is prepared by the reaction of a stoichiometric amount or a slight excess of the polyisocyanate.

14. The composition of claim 1 wherein the polyisocyanate comprises MDI and the polydiene has hydroxy terminal groups with a functionality ranging from about 2.2 to 2.6.

15. The composition of claim 1 wherein the bitumen comprises a straight run hydrocarbon.

16. The composition of claim 1 wherein the polyisocyanate comprises MDI and the polydiene hydrocarbon comprises a homopolymer of polybutadiene with primarily terminal hydroxyl groups and the equivalent ratio of the MDI and polybutadiene does not fall below 0.85.

17. A polymer-modified bitumen coating composition, which composition comprises:

a) a bitumen;

b) a modifying amount of from about 5 to 25 percent by weight of the composition of a urethane polymer prepared in situ with melted bitumen by the reaction of a hydroxyl-terminated polybutadiene with a stoichiometric amount or a slight excess of a diisocyanate, the urethane polymer mixed and dispersed in the bitumen to form an interpenetrating polymer network;

c) a tackifier agent of a mineral oil in an amount of about 5 to 25 percent by weight of the composition;

d) a particulate inert filler material having an average particle size of less than about 100 microns and in an amount of from about 5 to 25 percent by weight of the composition; and e) the bitumen composition, characterized by a selected degree surface tackiness and stable fluid properties over a temperature range of about 10 to 125 degrees Fahrenheit.

* * * * *